United States Patent [19]

Collier

[11] 4,208,850
[45] Jun. 24, 1980

[54] CONNECTOR FOR KNOCK-DOWN CABINET

[76] Inventor: David L. Collier, 255 NW. 96th Ave., Portland, Oreg. 97229

[21] Appl. No.: 904,851

[22] Filed: May 11, 1978

[51] Int. Cl.² .................. E04C 1/10; E04C 1/30; E04B 1/00; E04B 5/00
[52] U.S. Cl. .................. 52/285; 52/585; 403/406; 403/DIG. 10; 297/440
[58] Field of Search .......... 403/DIG. 10, 405, 406, 403/379, DIG. 4; 108/153; 312/263, 257 A; 52/285, 585; 297/440

[56] References Cited
U.S. PATENT DOCUMENTS

| 861,911 | 7/1907 | Stewart | 312/363 UX |
| 3,748,009 | 7/1973 | Stone | 312/263 |
| 4,131,376 | 12/1978 | Busse | 403/12 |

FOREIGN PATENT DOCUMENTS 1412288 11/1975 United Kingdom ............... 403/406

Primary Examiner—Wayne L. Shedd
Attorney, Agent, or Firm—Oliver D. Olson

[57] ABSTRACT

A base member is secured to one of a pair of cabinet panels to be connected together, and a locking member carried slidably by the base member is movable from a retracted position rearwardly of the front side of the base member to an extended position in which it extends forwardly beyond said front side into a locking opening provided in the other of the pair of cabinet panels, the panel to which the base member is secured being provided with an abutment surface spaced from the front side of the base member sufficiently to receive between them the portion of the other panel provided with the locking opening, whereby the extended locking member enters the locking opening and connects the panels together.

16 Claims, 14 Drawing Figures

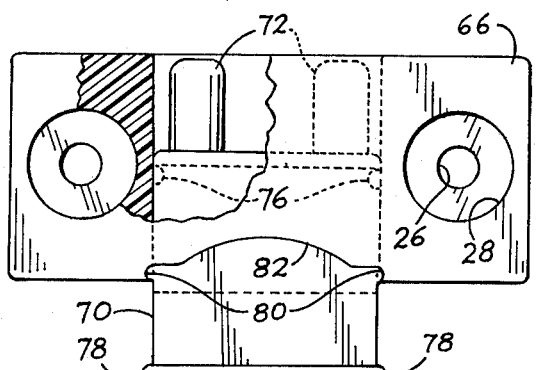
Fig.6.
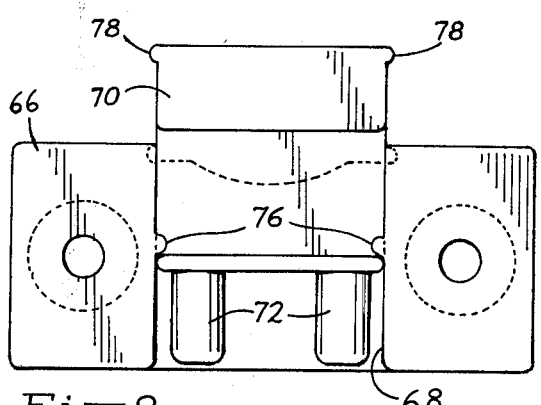
Fig.8.
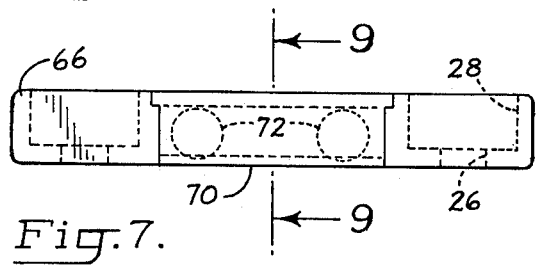
Fig.7.
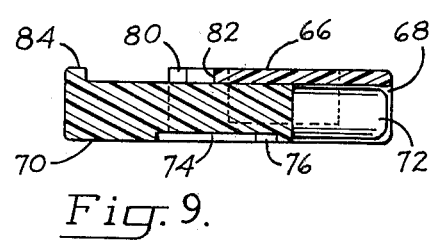
Fig.9.
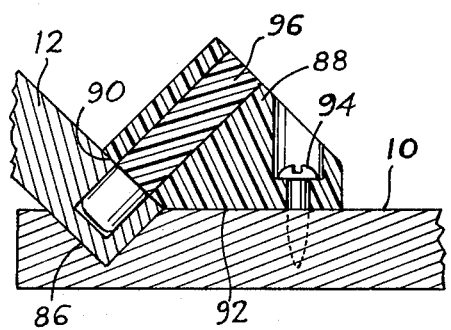
Fig.10.
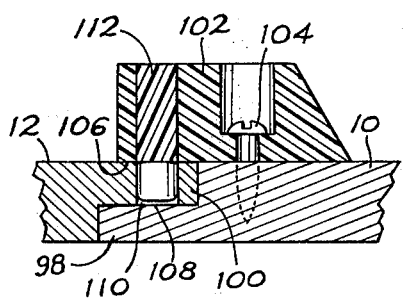
Fig.11.
Fig.12.
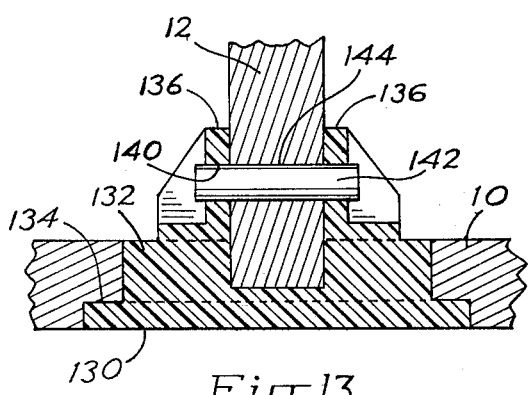
Fig.13.
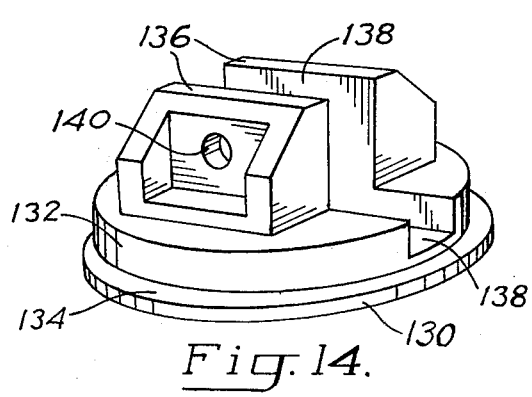
Fig.14.

CONNECTOR FOR KNOCK-DOWN CABINET

BACKGROUND OF THE INVENTION

This invention relates to knockdown cabinets, and more particularly to a novel connector by which cabinet panels are joined together to form cabinets.

The panels of knockdown cabinets have been connected together heretofore by connectors which comprise two interlocking components, one secured to each of the two panels to be connected together. An example of this type of cabinet and connector is disclosed in U.S. Pat. No. 3,403,641. The two interlocking connector components represent significant manufacturing cost and involve substantial cost of labor required to secure them to the appropriate places on the associated pairs of cabinet panels. Further, since one of the pair of connector components projects a significant distance outwardly from the associated cabinet panel, a severe limit is placed upon the degree of compactness to which the panels can be collected together in knocked down form for packaging, shipment and storage preliminary to purchase and erection into cabinet form.

Still further, the two interlocking connector components are brought into locked condition only when the pair of panels reach their ultimate position of assembly, at which point the two interlocking components snap into interengagement. Since the connectors are utilized at least in pairs, and quite often in greater numbers to interconnect adjacent panels of considerable length, it is apparent that the disassembly of such panels requires that all of the connectors be released simultaneously, for otherwise the panels will not separate. Accordingly, dis-assembly requires the active participation of one person for each connector, in order to achieve simultaneous dis-engagement of the components of each connector.

SUMMARY OF THE INVENTION

In its basic concept, this invention provides a knockdown cabinet in which one of each of a plurality of pairs of panels to be connected together is provided with an abutment surface for the other panel of the pair, a connector base is attached to said one panel of the pair on the side of the other panel opposite the abutment surface, and a locking member is mounted on the base for movement toward and away from said abutment surface into and out of a registering locking opening in said other panel of the pair, whereby the latter is secured to said one panel between the abutment surface and the connector base.

It is by virtue of the foregoing basic concept that the principal objective of this invention is achieved; namely, to overcome the aforementioned disadvantages and limitations of prior knockdown cabinets and panel connectors.

Another objective of this invention is the provision of a knockdown cabinet of the class described in which the connector base and associated locking member are held together in both the knocked down and assembled condition of the panels.

Still another objective of this invention is the provision of a knockdown cabinet of the class described in which the connector may be provided in forms which accommodate the connecting together of pairs of panels which are disposed at a variety of included angles.

Another objective of this invention is the provision of a knockdown cabinet of the class described in which a plurality of connectors may be locked and unlocked one at a time, whereby to facilitate the disassembly of cabinet panels by one person.

Another objective of this invention is the provision of a knockdown cabinet of the class described which may be assembled and disassembled without the use of hand tools.

A further objective of this invention is the provision of a knockdown cabinet of the class described in which indexing means is provided for securing the connector base to its associated panel with speed and facility for precise alignment of the locking member with the locking opening in the other panel of the pair.

A still further objective of this invention is the provision of a knockdown cabinet of the class described which includes a panel connector of simplified construction for economical manufacture, which is secured to only one panel of each pair, with speed and facility, and which projects from said panel a minimum distance whereby the panels for a complete cabinet may be assembled in knocked down form into a package of minimum bulk.

The foregoing and other objects and advantages of this invention will appear from the following detailed description, taken in connection with the accompanying drawings of preferred embodiments.

BRIEF DESCRIPTION OF THE DRAWINGS

FIG. 6 is a plan view of a third form of panel connector embodying the features of this invention.

FIG. 7 is a rear view as viewed from the bottom in FIG. 6.

FIG. 8 is a bottom view as viewed from the bottom in FIG. 7.

FIG. 9 is a sectional view taken on the line 9—9 in FIG. 7.

FIG. 10 is a fragmentary sectional view showing a panel connector arranged to connect together a pair of cabinet panels disposed to provide an included obtuse angle.

FIG. 11 is a fragmentary sectional view showing a panel connector securing together a pair of cabinet panels disposed side-by-side and provided with a shiplap joint.

FIG. 12 is a fragmentary sectional view showing a panel connector joining a pair of cabinet panels disposed side-by-side and provided with a tongue-and-groove joint.

FIG. 13 is a fragmentary sectional view of still another form of panel connector embodying the features of this invention.

FIG. 14 is a perspective view of the connector illustrated in FIG. 13.

DESCRIPTION OF THE PREFERRED EMBODIMENTS

It is to be noted that the drawings illustrate a single pair of cabinet panels to be joined together. This single pair of cabinet panels is sufficient to illustrate the invention, it being understood, of course, that a knockdown cabinet may be composed of a large number of pairs of cabinet panels connected together releasably by means of one or more of the various forms of panel connectors to be described.

Figure 1:
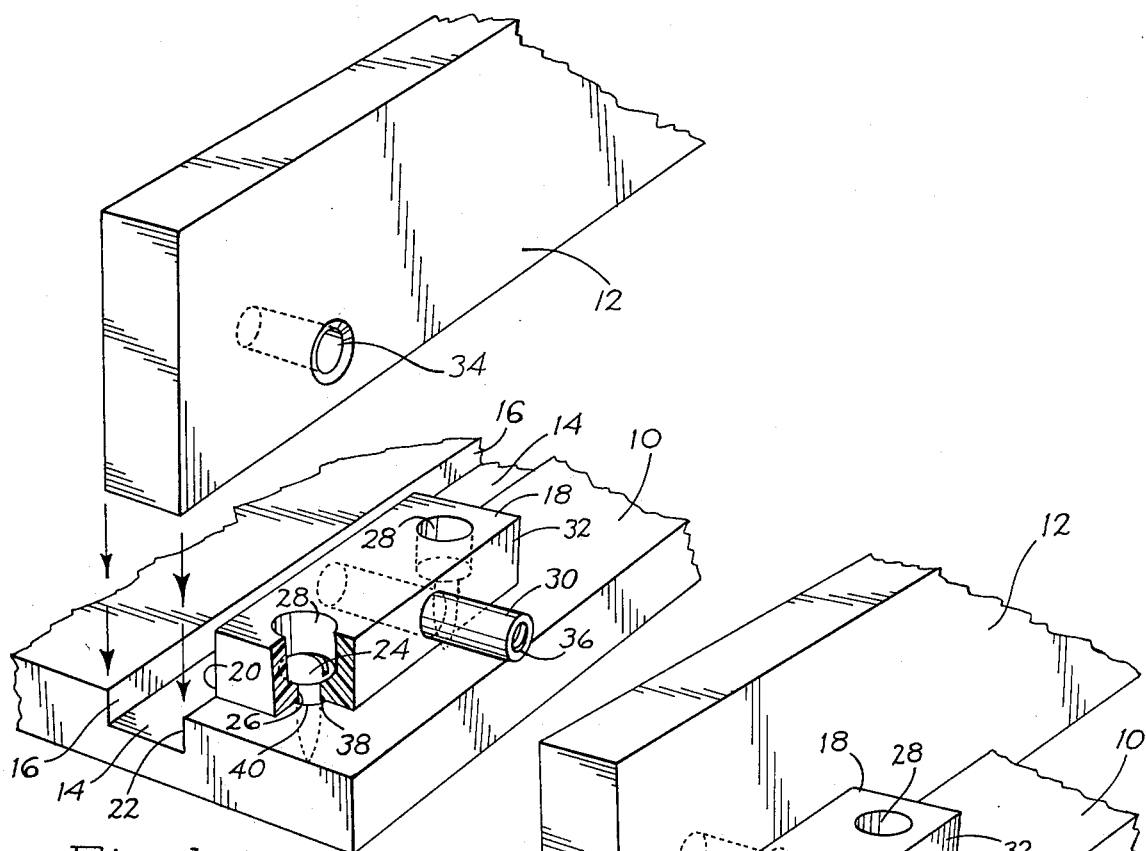
FIG. 1 is a fragmentary exploded view in perspective of a portion of a knockdown cabinet embodying the features of this invention, the pair of cabinet panels being shown in separated condition.
Figure 2:
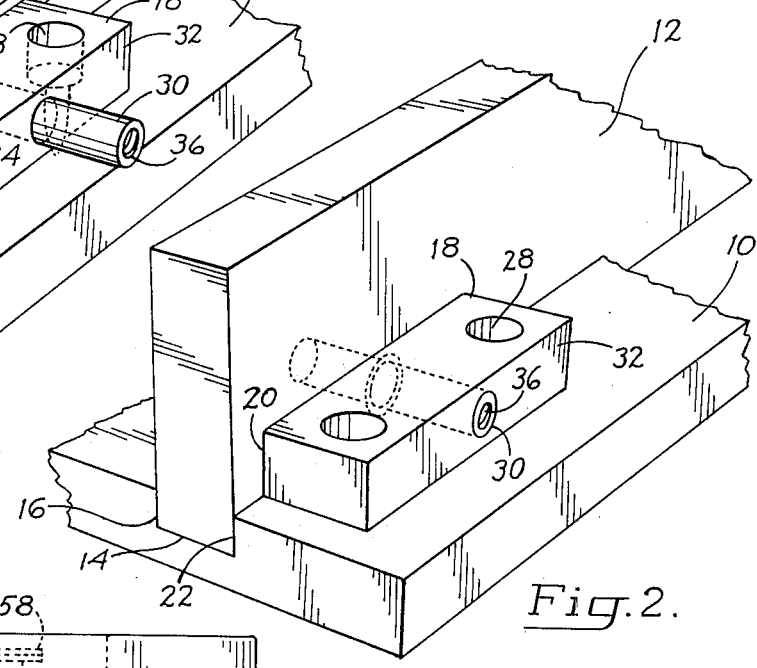
FIG. 2 is a fragmentary perspective view similar to FIG. 1 showing the pair of cabinet panels connected together by a panel connector embodying the features of this invention.

Referring first to the embodiment illustrated in FIGS. 1 and 2, there is shown for purposes of illustration a portion of a horizontal panel 10 and a portion of a vertical panel 12 to be joined together. The horizontal panel may be a shelf, and the vertical panel may be a vertical divider or end panel.

Means is provided on one of the pair of panels to form an abutment surface for the other of the pair of panels. As illustrated, the horizontal panel 10 is provided with a longitudinal groove 14, as by a dado cut, one surface 16 of which defines said abutment surface. The width of the groove is made substantially equal to the thickness of the vertical panel 12, whereby to receive the latter therein (FIG. 2).

The panel connector illustrated in FIGS. 1 and 2 includes a base member 18 in the form of a block of synthetic plastic, wood, or other suitable material. It has a front side 20 and is mounted on the horizontal panel 10 with the front side facing the abutment surface 16 formed by the groove 14 but spaced rearwardly therefrom sufficiently to allow the vertical panel 12 to be interposed between them. In the preferred embodiment illustrated, the front side of the base member is substantially aligned with the vertical edge 22 of the groove opposite the abutment surfaces 16.

The base member 18 may be secured to the panel by any of a variety of suitable means, including adhesive. In the preferred embodiment illustrated, it is secured by means of a pair of screws 24. Thus, the base member is provided with a pair of laterally spaced bores the bottom portions 26 of which are sized to receive the threaded shanks of the screws and the outer portions 28 of which are counterbored to large diameter to receive the heads of the screws.

The connector also includes a locking member which is carried by the base member and which is movable relative to the latter between a retracted position rearwardly of the front side 20 of the base member (FIG. 1) and an extended position projecting forwardly of the front side toward the abutment surface 16.

In the embodiment of FIGS. 1 and 2, the locking member is in the form of an elongated cylinder 30 which is mounted slidably in a cylindrical bore which extends through the front side and rear side 32 of the base member. The vertical panel 12 of the pair of panels to be connected together is provided with a locking opening 34 arranged to register with the opening in the base member and hence with the locking cylinder 30, when the vertical panel is seated in the groove 14 in the horizontal panel and properly oriented with respect to the horizontal panel. The locking cylinder then may be pushed forwardly to enter the locking opening in the vertical panel. This opening may extend completely through the vertical panel, or it may terminate within the panel, as desired. The end of the locking opening confronting the locking cylinder preferably is countersunk, as illustrated, to facilitate the entry of the locking cylinder into the opening.

Gripping means preferably interengages the base member and locking member for releasably retaining the locking member in the retracted and extended positions relative to the base member. In the embodiment illustrated in FIGS. 1 and 2, the gripping means is provided by a friction fit between the bore in the base member 18 and the outer surface of the locking cylinder 30.

To facilitate retraction of the locking cylinder from the extended position illustrated in FIG. 2, the rearward end of the locking cylinder is provided with an internally threaded bore 36 adapted to receive the threaded end of an extracting tool (not shown). Thus, by connecting the tool to the rearward end of the locking cylinder, the tool and connected cylinder may be pulled rearward to extricate the locking cylinder from the locking opening in the vertical panel.

Figure 4:
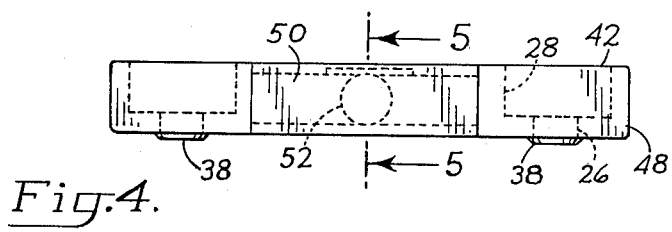
FIG. 4 is a rear view as viewed from the bottom in FIG. 3.
Figure 5:
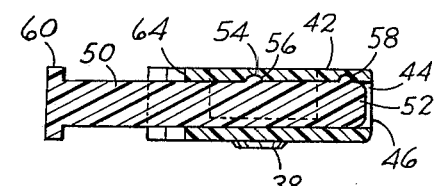
FIG. 5 is a sectional view taken on the line 5—5 in FIG. 4.

As illustrated in FIG. 1, and also in FIGS. 4 and 5 of the second embodiment, indexing means is provided for locating the base member 18 on the cabinet panel 10 with speed and facility and in precise alignment of the locking cylinder 30 with the locking opening 34 in the vertical panel 12. This indexing means is provided by an annular shoulder 38 projecting downward from the bottom surface of the base member around each of the screw receiving bores 26. The horizontal panel 10 also is provided with registering sockets 40 arranged to receive the annular indexing projections 38. Thus, the base member is located precisely on the horizontal panel for accurate registration on the locking cylinder with the locking opening provided at the desired location in the vertical panel. In this regard, it will be understood that the locking opening 34 in the vertical panel and the indexing sockets 40 in the horizontal panel are formed at the precise desired locations by automatic production machinery well known to those skilled in the art.

Figure 3:
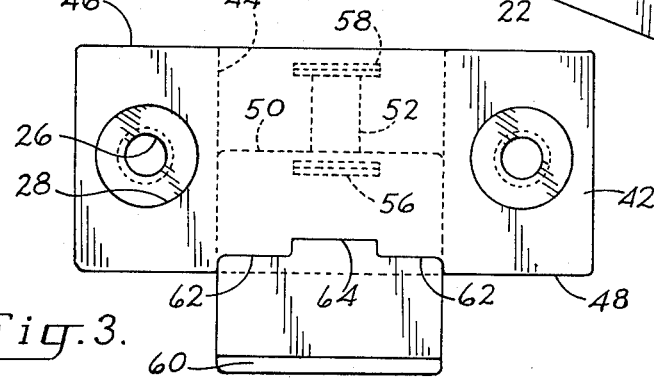
FIG. 3 is a plan view of a second form of panel connector embodying the features of this invention.

Referrring now to the embodiment illustrated in FIGS. 3-5, the base member 42 is provided with a rectangular opening 44 through its front and rear sides 46 and 48, respectively. The locking member includes a rearward section 50 matching the rectangular cross section of the opening 44 for reception freely therein, and a cylindrical forward section 52 forming a locking pin dimensioned for reception in a locking opening 34 provided in the other panel of the pair.

The gripping means which interengages the base member and locking member for releasably retaining the locking member in the retracted and extended positions, comprises a tab 54 and a pair of longitudinally spaced sockets 56 and 58 on the base and locking members. As illustrated, the tab is provided on the locking member and projects upwardly from the upper surface of the rectangular section 50 thereof for removable reception in one or the other of the longitudinally spaced sockets on the confronting inner surface of the base member. The rearward socket 56 is arranged so that when the tab is received in it, the cylindrical locking pin section 52 is in the retracted position rearwardly of the front side 46 of the base member. The forward socket 58 is positioned so that when the tab enters it the cylindrical locking pin section 52 is extended forwardly of the front side of the base member and has entered the locking opening 34 in the other cabinet panel of the pair.

In this position of extension, the rearward end of the locking member is brought flush with the rear side of the base member. Upper and lower lateral shoulders 60 on the rearward end of the locking member enter correspondingly contoured upper and lower notches 62 formed in the rear side of the base member. A central deepened notch 64 in the upper surface of the base member provides an opening for a thumb nail for assisting the removal of the tab 54 from the front socket 58 for retracting the locking member from the extended position.

In the embodiment illustrated in FIGS. 6–9, the base member 66 is provided with a central longitudinal opening in the form of a rectangular groove 68 which is open on the bottom side of the base member. The locking member has a rearward section 70 of rectangular cross section substantially matching the rectangular cross sectional shape of the groove 68 in the base member. It is provided with a pair of laterally spaced, forwardly projecting cylindrical locking pin sections 72. It will be understood that this pair of laterally spaced locking pin sections require the provision of a correspondingly laterally spaced pair of locking openings 34 (FIG. 1) in the other cabinet panel of the pair.

The connector illustrated in FIGS. 6–9 may be provided with a single locking pin section 72 or with more than two locking pin sections, as dictated by the strength requirements of the panels to be assembled.

A transverse groove 74 is formed in the bottom surface of the locking member intermediate the longitudinal ends of the rectangular section 70. A pair of inwardly extending tabs 76 are formed on the side edges of the longitudinal groove 68 in the base member, for reception in the transverse groove in the locking member. As best shown in FIG. 8, these inwardly directed tabs serve to abut the forward end of the transverse groove in the locking member adjacent the forward locking pin sections, to limit the extent of retraction of the locking member relative to the base member.

The rearward end of the rectangular section 70 of the locking member is provided with a pair of laterally projecting tabs 78 which are arranged to snap into corresponding lateral sockets 80 formed in the rearward side of the base member 66, to secure the locking member in its extended position, with the forward cylindrical locking pin sections 72 received in locked openings 34 in the other cabinet panel. An arcuate notch 82 in the base member intermediate the laterally spaced sockets 80 provides a space between the base member and the upwardly projecting shoulder 84 across the rearward end of the locking member, for the use of a thumb nail in retracting the locking member from its extended position.

In FIGS. 1 and 2 the cabinet panels 10 and 12 are shown to be disposed perpendicularly with respect to each other. There may be instances in which the panels of a pair are to be disposed to provide an included obtuse angle. Such an arrangement is illustrated in FIG. 10. For this purpose a groove is provided in one of the panels 10 to define the abutment surface 86 for the other panel 12. The groove is formed so that the abutment surface extends at the obtuse angle desired. As illustrated, the included obtuse angle between the panels is 135°. Accordingly, the base member 88 of the connector is formed with its front side 90 and bottom side 92 forming the corresponding included angle of 135°.

The base member 88 is secured to the one panel 10 of the pair, as by screws 94, so that the front side 90 faces the abutment surface 86, but is spaced therefrom a distance substantially equal to the thickness of the other panel 12 of the pair. Accordingly, said other panel 12 is received freely between the abutment surface 86 defined by the groove and the front side of the base member and is secured in that position by extension of the locking member 96. It will be understood that the locking member may take the form of any of the embodiments previously described.

FIG. 11 illustrates a pair of cabinet panels 10 and 12 disposed side-by-side in the same plane and provided with tongues 98 and 100 a shiplap joint. The base member 102 of the connector is secured to one of the panels 10, as by screws 104, so that the front side 106 faces but is spaced from an abutment surface 108 defined by the tongue 98 of the panel 10. The other panel 12 of the pair is arranged with its projecting tongue 100 extending into the groove formed between the abutment surface 108 of the first mentioned panel 10 and the front side 106 of the base member 102. A locking opening 110 is formed in the tongue 100 of the panel 12 to register with the locking pin section of the locking member 112. The two panels of the pair thus are secured together at the shiplap joint.

In FIG. 12, a pair of panels 10 and 12 are arranged side-by-side in the same plane and provided with an interconnecting tongue and groove joint. Thus, one of the panels 10 is provided with a longitudinal groove 114 in its edge, intermediate its top and bottom sides, while the other panel is grooved to provide a longitudinal tongue 116 dimensioned for reception in the longitudinal groove. The bottom surface 118 of the groove forms an abutment surface for the tongue. A portion of the panel 10, above the groove 114 as illustrated in FIG. 12, is cut away in a desired area to provide space for a base member 120 which is secured to the corresponding panel 10, as by means of screws 122. The locking opening 124 is provided in the tongue 116 of the other panel 12 for registration with the locking pin section of the locking member 126 associated with the base member, whereby the pair of panels are joined together releasably, as illustrated.

In the embodiments described hereinbefore, the attachment of the base member to a panel is accomplished by means of screws extending through counterbored openings in the base member. The embodiment illustrated in FIGS. 13 and 14 eliminates the need for such attachment screws.

Thus, the base member is provided with an insert portion which includes a back section 130 of greater lateral dimension than the associated front section 132, whereby to provide a shoulder 134 therebetween. Although the insert portion may be square, rectangular or other shape in plan view, it preferably is circular, as illustrated in FIG. 14. The circular configuration thus allows the insert opening in the associated panel 10 to be made by a rotary drill of the corresponding shape and dimension, enabling the installation of the insert portion of the base member by a press fit.

The projecting portion of the base member is configured to provide at least one, and preferably a pair of upstanding walls 136 spaced apart to provide between them a groove 138 matching the lateral dimension of the groove 14 (FIG. 1) provided in the associated panel 10. The groove extends through a portion of the thickness of the front section 132 of the insert portion, to intercept the groove 14 in the panel.

The laterally spaced upstanding walls are provided with axially aligned openings 140 for the removable reception of a locking pin cylinder 142, for example of the type illustrated in FIGS. 1 and 2. As in the previous embodiments, the other panel 12 of the pair to be interconnected is provided with a locking opening 144 arranged to register with the axially aligned openings 140 in the walls, when the panel 12 is seated in its retaining groove 14 in the panel 10 and the aligned groove 138 in the connector. Maximum strength of connection is achieved by virtue of the locking pin 142 extending completely through the panel 12 and being seated adjacent its opposite ends in the pair of walls 136.

It will be understood, however, that one of the walls 136 may be omitted if the mode of connection illustrated in FIGS. 1 and 2 provides sufficient strength. In such event, the groove 138 is retained for alignment with the groove 14 in the panel 10 and the other wall 136 provides the equivalent of the front side 20 of the base member facing the abutment surface 16, as per FIGS. 1 and 2.

As will be apparent, the connector illustrated in FIGS. 13 and 14 require no screws for attachment to the panel 10. It is secured to the panel simply by pressing it into the counterbored opening through the panel, in the direction toward panel 12, whereby it is retained in position by a press fit preliminary to attachment of the other panel 12. Upon insertion of the locking cylinder 142, the two panels are secured together positively since the connector is held in the counterbored opening in the panel 10 by the locking pin 142 which extends through the other panel 12 seated in the groove 14 formed in the first named panel 10.

The insert arrangement illustrated in FIGS. 13 and 14 may be utilized for the types of connector base members described hereinbefore. Thus, for example, the rectangular base member illustrated in FIGS. 1 and 2 may be provided with an insert portion which extends through a rectangular opening in the panel 10, the opening and insert portion being provided at their lateral ends with an interengaging shoulder 134 as illustrated in FIG. 13. The configuration illustrated in FIGS. 1 and 2 could otherwise be the same as shown, with the front face 20 of the base member being aligned with the edge 22 of the groove.

It is to be observed from the foregoing that the panel connector of this invention is attached in its entirety to but one of a pair of cabinet panels to be connected together. This minimizes the time and hence cost of assembly. The base member is of minimum thickness, and since the other panel of each pair is completely devoid of connector attachments, the multiplicity of panels making up a cabinet may be assembled together in knocked down condition in a package of minimum size. This contributes beneficially to minimizing the cost of shipment, handling and storage.

It will be apparent to those skilled in the art that various changes may be made in the size, shape, type, number and arrangement of parts described hereinbefore without departing from the spirit of the invention.

Having now described my invention and the manner in which it may be used, I claim:

1. In combination with a pair of panels to be connected together, wherein one of the panels is provided with an abutment surface for the other panel, a panel connector comprising:
   (a) a base member having a front side,
   (b) a locking member mounted on the base member for movement between a retracted position rearwardly of said front side and an extended position projecting forwardly of said front side, and
   (c) securing means for securing the base member to said one panel with the front side of the base member facing but spaced from said abutment surface for reception of said other panel therebetween, and with the locking member located outwardly of the profile of said one panel,
   (d) said other panel having a locking opening therein registering with the locking member for removable reception of the latter.

2. The combination of claim 1 including gripping means inter-engaging the base member and locking member for releasably retaining the locking member in said retracted position.

3. The combination of claim 2 wherein the gripping means comprises interengageable tab and socket means on the base and locking members arranged for releasable interengagement at the retracted position of the locking member.

4. The combination of claim 1 including gripping means inter-engaging the base member and locking member for releasably retaining the locking member in said retracted and extended positions.

5. The combination of claim 4 wherein the gripping means is provided by a friction fit between the locking member and base member.

6. The combination of claim 4 wherein the gripping means comprises interengageable tab and socket means on the base and locking members arranged for releasable interengagement at the retracted and extended positions of the locking member.

7. The combination of claim 1 including indexing projection means extending from the bottom surface of the base member and indexing socket means on said one panel for reception of the indexing projection means for orienting the base and locking members relative to the associated locking opening in said other panel.

8. The combination of claim 7 wherein the securing means comprises screws extending through spaced openings in the base member, and the indexing means comprise annular projections surrounding said openings in the base member and sockets in said one panel for reception of the annular projections for orienting the base and locking members relative to the associated locking opening in said other panel.

9. The combination of claim 1 wherein the panels are disposed perpendicular to each other, said one panel is provided with a groove having a width substantially equal to the thickness of the said other panel, one side of the groove defining said abutment surface, and the base member is secured to an outer surface of said one panel with its front side substantially aligned with the side of the groove opposite the side defining said abutment surface.

10. The combination of claim 1 wherein the panels are disposed at an included obtuse angle, said one panel is provided with a groove defining said abutment surface disposed at said obtuse angle, and the base member is secured to said one panel with its front side disposed parallel to said abutment surface.

11. The combination of claim 1 wherein the panels are disposed side-by-side in the same plane, the adjacent sides of the panels being grooved to provide lapping portions, the groove in said one panel defining said abutment surface and the groove in said other panel defining a lapping portion having said locking opening for the removable reception of the locking member.

12. The combination of claim 11 wherein the grooves in the panels provide a shiplap joint.

13. The combination of claim 11 wherein the grooves in the panels provide a tongue-and-groove joint.

14. The combination of claim 1 wherein the securing means comprises an insert portion on the rear side of the base member proportioned and arranged for removable reception in an insert opening through said one panel, said insert portion and opening having offset portions defining abutting shoulders for limiting the extent of insertion of the base member into the insert opening in the direction toward said other panel.

15. The combination of claim 14 wherein said one panel is provided with a groove having a width substantially equal to the thickness of the said other panel for receiving the latter, the forward portion of the base member and a forward section of the insert portion is provided with a groove of corresponding width for alignment with the groove in said one panel and for reception of said other panel therein, the portion of the groove in the forward portion of the base member defining a pair of spaced walls, the locking member extending retractably through aligned openings in the spaced walls of the base member and in the said other panel.

16. The combination of claim 1 wherein the abutment surface is provided by one side of a groove in said one panel and wherein the base member is secured to said one panel with its front side aligned with the side of the groove opposite the side providing the abutment surface.

* * * * *